United States Patent [19]

McRay

[11] Patent Number: 4,815,786
[45] Date of Patent: Mar. 28, 1989

[54] COMBINED CAMPER/PICKUP-TRUCK

[76] Inventor: David L. McRay, 1003A Leaphart St., West Columbia, S.C. 29169

[21] Appl. No.: 164,180

[22] Filed: Mar. 4, 1988

[51] Int. Cl.$^4$ .............................................. B60P 3/34
[52] U.S. Cl. .................................... 296/165; 296/100; 296/164; 296/26; 296/27
[58] Field of Search ................... 296/26, 27, 100, 105, 296/164, 165, 171, 173, 175

[56] References Cited

U.S. PATENT DOCUMENTS

| | | | |
|---|---|---|---|
| 3,145,044 | 8/1964 | Harrison | 296/164 |
| 3,175,857 | 3/1965 | Lewis | 296/164 |
| 3,286,414 | 11/1966 | Harrison | 296/165 X |
| 3,572,812 | 3/1971 | Norcia | 296/26 |
| 3,690,719 | 9/1972 | Yount | 296/164 |
| 3,694,024 | 9/1972 | Linville | 296/26 |
| 3,790,207 | 2/1974 | Anderson | 296/164 |
| 4,012,070 | 3/1977 | Mertz | 296/27 |
| 4,088,363 | 5/1978 | Palmer | 296/161 |
| 4,206,943 | 6/1980 | Friedenberg | 296/26 |
| 4,220,370 | 9/1980 | Rice | 296/165 |
| 4,542,932 | 9/1985 | Whiteman | 296/26 X |
| 4,603,901 | 8/1986 | McIntosh | 296/165 |

Primary Examiner—Robert B. Reeves
Assistant Examiner—John Gruber
Attorney, Agent, or Firm—Terry M. Gernstein

[57] ABSTRACT

A camper and a pickup truck are combined so that the camper can be stored in the cargo area of the pickup truck in a manner that does not interfere with the operation of the pickup truck. The camper has rigid walls so the camper is suitable for use in inclimate weather conditions, yet the cargo area of the truck is essentially unobstructed when the camper is in the stored configuration. The camper top is stored on top of the bed of the truck.

10 Claims, 4 Drawing Sheets

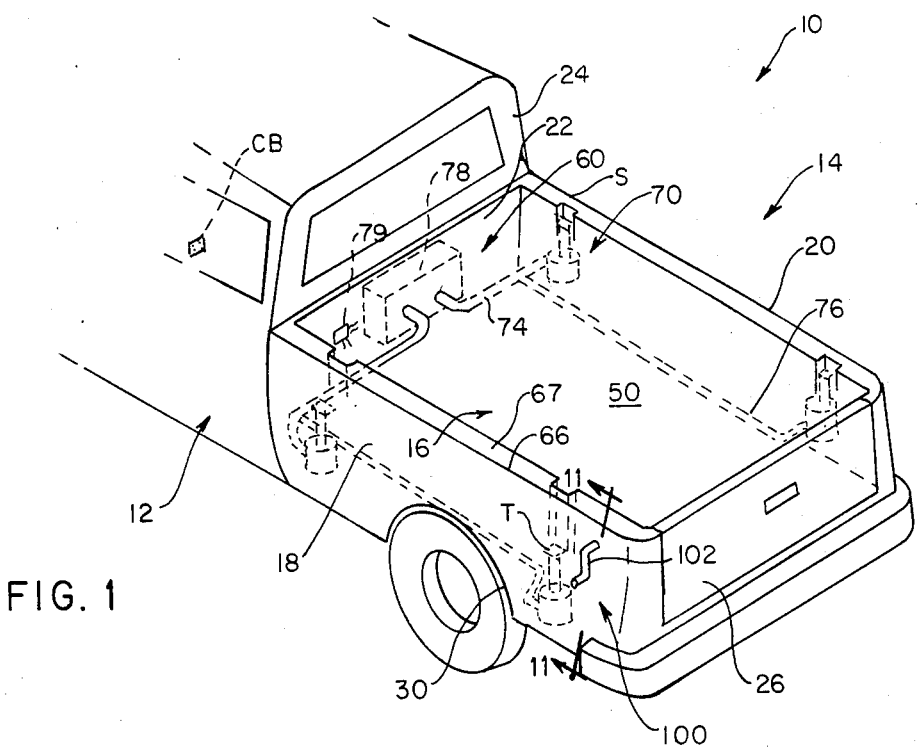
FIG. 1
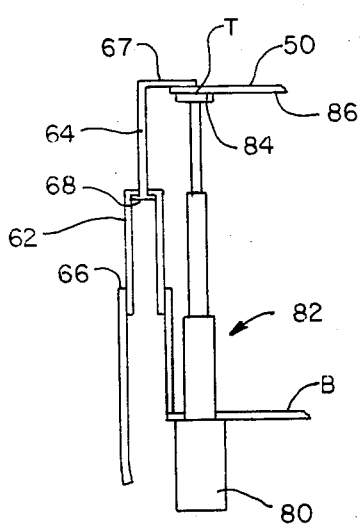
FIG. 3
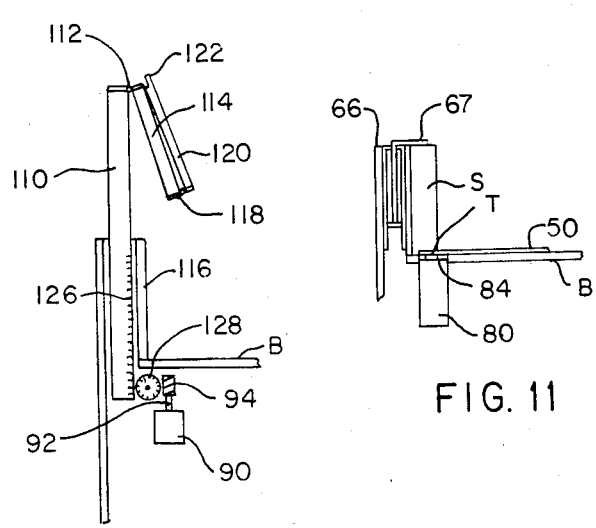
FIG. 4
FIG. 11

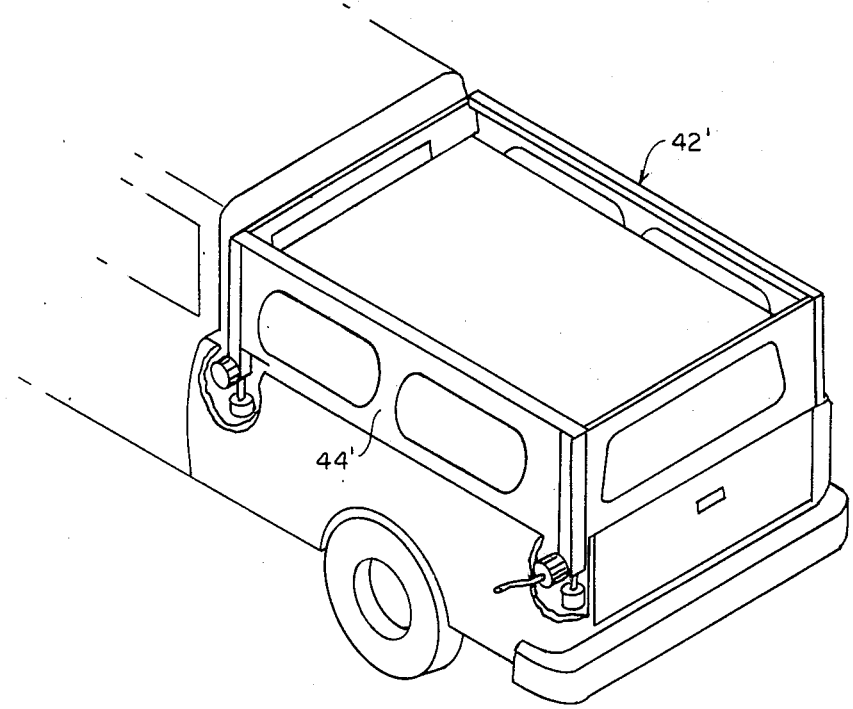
FIG. 10
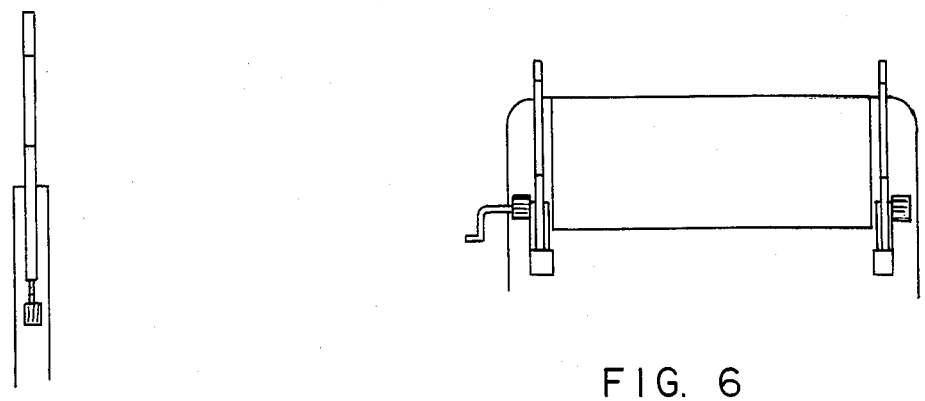
FIG. 5
FIG. 6

COMBINED CAMPER/PICKUP-TRUCK

FIELD OF THE INVENTION

The present invention relates in general to vehicles, and more particularly to pick-up truck type vehicles. Specifically, the present invention relates to a combination camper/pickup truck.

BACKGROUND OF THE INVENTION

A pickup truck is a vehicle in common and popular use today, and includes a cab in which the driver and passengers sit, and a cargo area located behind the cab. The pickup truck is designed for everyday use, and has found increasing use in the area of recreation.

In that segment of the art of recreation having to do with travel and camping, there is an ever increasing use of the pickup truck. Often, these pickup trucks are equipped with special sleeping or living accommodations. The most common of such accommodations is the so-called camper. The camper generally includes a box-like shelter unit which is equipped with sleeping and cooking facilities.

These campers are generally carried in the cargo area of a pickup truck.

While gaining in popularity, such camper/pickup truck combinations have had shortcomings that have somewhat inhibited the popularity and continued growth of the camper industry.

For example, the campers must be large enough to accommodate a person in some amount of comfort, and thus are often large and bulky and may thus adversely affect the handling of the pickup truck. This is especially a problem if the combined unit is to be driven over difficult terrain or in close quarters, such as through dense brush or the like. In an extreme situation, such handling problems may be hazardous.

Recently, several designs have been proposed in order to overcome this shortcoming. For example, a tentlike configuration has been proposed in U.S. Pat. No. 4,088,363 which is stored in the collapsed condition in the cargo area of the truck. While overcoming the above-mentioned problem, this design has the serious drawback of having soft camper walls and top in the nature of a tent. Such a tent may be suitable for some uses; however, it is not suitable for all uses, especially those uses in which the combination is to be used in extremely difficult weather conditions, such as extremely cold conditions, extremely windy conditions, or the like.

Other designs have been proposed in which the camper is partially collapsed in the stored configuration and then is raised into the set-up configuration. Examples of such design proposals are: U.S. Pat. Nos. 3,145,044; 3,690,719; 4,012,070 and 4,603,901. While these designs provide a camper that can include rigid walls, they have the serious shortcoming of rendering the cargo area essentially useless for any purpose other than as a means for carrying the camper. Such a drawback severely inhibits the advantages of the pickup truck that are making such a vehicle popular.

Still other designs of campers propose to remove the camper entirely from the pickup truck when the camper is not in use. While this overcomes the problems associated with preventing use of the cargo area during camper non-use times, it has the drawback of being extremely inconvenient and onerous to set up the camper, or adapting the pickup truck from its normal mode to get it ready for a camping trip.

Other designs include a camper that is towed behind the pickup truck. Such designs have drawbacks associated with the handling of the unit in difficult terrain and parking it.

Accordingly, there is need for a camper/pickup truck combination that permits the pickup truck to be handled and operated in the manner common to the pickup truck, including the hauling of cargo, when the camper unit is stored, yet will permit the camper unit to include rigid walls and top so as to be amenable to all sorts of weather conditions yet can be erected quickly, efficiently and by one person when desired.

OBJECTS OF THE INVENTION

It is a main object of the present invention to provide a camper/pickup combination which permits a rigid wall camper structure to be used with a pickup truck in a manner that permits the pickup truck to be used in its normal manner, including the hauling of cargo, when the camper is in the stored configuration in the cargo area of the pickup truck.

It is another object of the present invention to provide a combined camper/pickup truck combination which realizes the advantages of a rigid wall camper structure yet which permits the vehicle to be operated in a safe manner with the camper thereon.

It is another object of the present invention to provide a camper/pickup truck combination in which the camper is easily and efficiently erected from a stored configuration to a set-up configuration.

It is another object of the present invention to provide a camper/pickup truck combination in which the camper walls and top can be used to reinforce the walls and bed of the pickup truck cargo area when the camper is in the stored configuration.

It is another object of the present invention to provide a camper/pickup truck combination that has a rigid wall camper that is easily set up yet permits the cargo area of the pickup truck to be essentially unobstructed and essentially undiminished when the camper is in the stored configuration in that cargo area.

SUMMARY OF THE INVENTION

These and other objects are accomplished by providing a camper/pickup truck combination which includes a rigid camper top that lies on the cargo bed of the pickup truck when the camper is in the stored configuration, and configuring the walls of the pickup truck cargo area to accommodate the rigid walls of the camper within the outer perimeter of the cargo area. The combination then is provided with means for raising the camper top to a location spaced above the cargo area bed.

In one embodiment, the camper walls are telescopingly received in and stored in hollow walls of the pickup truck cargo area, in another embodiment the camper walls are hingeably connected to the cargo area walls and are comprised of a plurality of sections that are hingeably connected together, with the camper top being composed of a plurality of hingeably connected sections. Yet another embodiment includes camper walls mounted on top of the cargo area walls, with the camper top resting on the bed of the cargo area.

The camper top is raised by means of a system that is either pneumatic or mechanical and which includes a control system having a control switch located inside the cab of the truck. Motors, either mechanical, electrical or hydraulic, are mounted in the cargo area to raise the camper roof, and an emergency hand crank can be included to raise or lower the camper roof in the event of a failure of the vehicle power. The components of the control systems and the means for moving the camper roof are located within the cargo walls and bed so that such elements are fully protected from damage from environmental factors, including rocks and the like often encountered by such vehicles.

Thus, the stored camper serves to reinforce the functions of the pickup truck instead of inhibiting such functions as has been the case with past designs. The pickup truck features are thus actually enhanced by the presence of the camper elements. The combination can be designed and sold as a unit instead of individual elements so that the best possible combinations can be made and the most efficient designs prepared. The pickup truck owner will not have to sacrifice functions to have a camper, and in fact, can have a cargo area that is stronger than a cargo area that is present in a vehicle not including such a camper.

In this manner, the camper can be viewed as being fully integrated into the pickup truck and the entire vehicle can be considered as being a unitary system instead of the camper being an "add-on" element for use with a pickup truck as has been the case with prior designs involving rigid wall campers. Such a unitary vehicle is an entirely new class of vehicle.

BRIEF DESCRIPTION OF THE DRAWINGS

FIG. 1 is a perspective view of a camper/pickup truck combination of the present invention showing the camper in the stored configuration.

FIG. 3 is an elevation view of one form of camper top raising means.

FIG. 4 is an elevation view of another form of camper top raising means.

FIG. 5 is an elevation view indicating one form of camper top raising means.

FIG. 6 is a rear elevation view schematically indicating the camper of the present invention.

FIG. 10 is a perspective view of another form of the present invention in the partially set-up condition.

FIG. 11 is an elevation view taken along line 11—11 of FIG. 1 showing the FIG. 1 embodiment in the camper in the stored condition with the camper top lying on top of the cargo area bed.

DETAILED DESCRIPTION OF THE PREFERRED EMBODIMENTS

Figure 2:
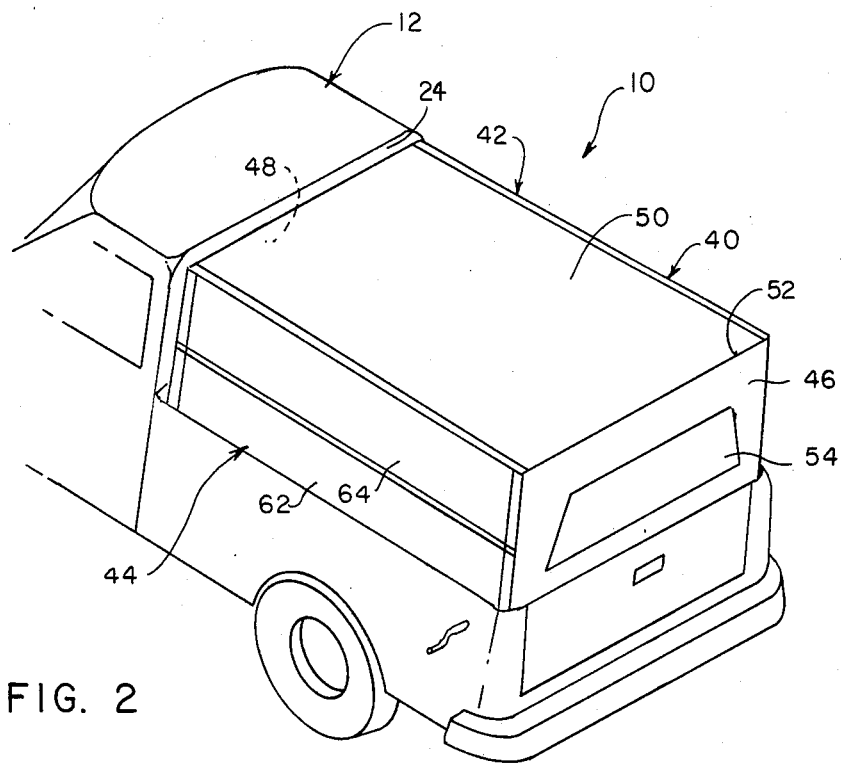
FIG. 2 is a rear perspective view of the camper/pickup truck combination of the present invention showing a camper in the erected, or set-up configuration.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

FIGS. 1 and 11 show a camper/pickup truck combination 10 with the camper collapsed into the stored configuration. As can be seen in FIG. 1, in such a configuration, the pickup truck appears to be the usual form of such vehicle. Accordingly, the truck 10 includes a cab portion 12 and a cargo portion 14 having a cargo area 16 therein. The cab portion 12 includes seats, dashboard and the like which are usual to such pickup trucks. The cargo portion 14 includes side walls 18 and 20 and a front wall 22 located immediately adjacent to the rear wall 24 of the cab. The cargo portion also includes a tailgate 26 and wheel wells 30. In the collapsed configuration of the camper, the truck has a totally open cargo area which is totally available for carrying cargo in the usual nature of such vehicles. The camper thus in no way interferes with the usual operation of the vehicle in its desired manner.

By next referring to FIG. 2, it can be seen that the overall vehicle 10 can be used as a camper-type vehicle by simply erecting the camper portion 40 of the vehicle 10. As can be seen in FIG. 2, the camper portion 40 includes a starboard side 42 wall and a port side 44 wall as well as an aft wall 46 and a fore wall 48. The camper also includes a top 50. The camper walls, sides and top are all rigid, that is, these walls and top are made from materials such as hard plastics or the like, so that the camper can be used in inclimate weather conditions which include extreme temperatures and/or high winds. The camper can also include beds, storage spaces and elements normal to such campers. In this manner, the camper can be used in all types of weather, while the overall vehicle and its operation is essentially unaffected by the presence of the camper portion.

In the stored configuration, the camper portion elements are totally out of the way in the cargo area of the vehicle. Thus, in one embodiment, the camper top 50 is sized to be essentially equal in size to the bed of the truck and to lie flat on top of that bed. Thus, in such an embodiment, the camper top forms a bed of the pickup truck cargo area. If the pickup truck includes wheel wells, the camper top 50 can be configured to have areas which will accommodate such wheel wells.

The camper side, front and aft walls are also stored out of the way in the cargo area. Accordingly, the side and front walls of the camper are stored within hollow truck walls and erected in a manner to be described below, or are stored in a collapsed condition adjacent to the side and front walls of the cargo area and erected in a manner to be described below. The camper aft wall 46 can be hingeably connected to the camper top 50 by a hinge 52 and can be stored beneath the camper top and between that top and the bed of the cargo area in the camper-stored configuration. When the camper is erected, this aft wall is swung down from such a position into the set-up position shown in FIG. 2. Alternatively, the camper aft wall could be separate from the camper itself and would then be attached to the camper side walls and to the top of the truck tailgate by hooks and/or hinges after the camper is set up.

It is noted that the camper walls can include any suitable windows, such as the window 54 in the aft wall, and such windows can be flexible plastic material as is usual to such windows. The side walls can also have windows, although such windows are not shown in FIG. 2.

The camper walls and top can be moved from the FIG. 1 stored configuration to the FIG. 2 set-up configuration by any of a plurality of means. Two such means are illustrated herein, and include a hydraulic system 60 illustrated in FIG. 1 or a mechanical system which will be discussed below. At any rate, any such system should include a control means located within the truck cab, with a control button CB on the cab dashboard so that a vehicle operator can erect or collapse the camper by merely suitably operating the control from within the cab.

In one embodiment, the camper walls are telescopingly received in the hollow walls of the truck. By referring to FIGS. 1, 2 and 3, it can be seen that such an embodiment can include the above-mentioned hydraulic system 60. In such an embodiment, each of the walls includes a hollow bottom section 62 and a top section 64 which is telescopingly received in the hollow bottom section 62 in the stored configuration of the camper. The top sections are both identical, and each includes a top flange 67 which extends into the cargo area of the vehicle and which rests on the top rim 66 of the associated truck side wall when the camper walls are collapsed into those hollow walls. The top sections 64 include flanges 68 which are located and adapted to engage a corresponding portion of the bottom section to lift that bottom section out of the hollow truck wall in a telescopic manner.

The flanges 67 of the wall top sections are engaged by the camper top 50 as that top is being moved from its stored location on top of the truck bed B (FIG. 3) to a location spaced above such truck bed during the erection of the camper portion. In the FIG. 1 embodiment, this lifting is effected by the hydraulic system 60, but could also be effected by a mechanical system to be described below.

The hydraulic system 60 includes a plurality of hydraulic jacks or pump units, such as unit 70, each located at one corner of the cargo area as defined by the intersection of the walls of that cargo area and each located within the walls and/or under the body of the truck so as to be located out of the way. The system 60 includes a plurality of fluid lines, such as line 74 and line 76 interconnecting the units together and to a control unit 78. The control unit 78 includes suitable fluid reservoirs, valves pumps, and the like necessary to the operation of the system 60. The system 60 can use any suitable fluid such as oil or the like, and the control unit can also include suitable electronic elements and microprocessors to control the operation of the overall system in a safe manner. The control unit 78 can be located beneath the cab or can be located in the walls of the vehicle and is, of course, suitably connected to the control elements located within the cab. The electronic control system is indicated schematically in FIG. 1 by phantom box 79 having suitable leads, such as lead L connecting the system to suitable control buttons, such as control button CB and power as necessary. The power can be supplied from the vehicle battery. The lines and leads of the top raising system are preferably located in the hollow walls of the cargo area, and the bed of that cargo area can also be hollow so the lines and leads can be contained therein.

One of the units 70 is shown in FIG. 3, and includes a cylinder 80 securely mounted on the vehicle and having an extensible arm 82 attached thereto. Operation of the cylinder in the manner usual to such hydraulic elements extends or retracts the arm with respect to the cylinder. The arm has a pad 84 on the distal end thereof for engagement with the undersurface 86 of the camper top 50. Operation of the cylinder by sending fluid from the control unit 78 causes the arm 82 to extend thereby raising the camper top. As that top moves past the upper rim 66 of the vehicle walls, it engages the flange 67 and raises those walls from the stored configuration thereof into the set-up configuration thereof. Reversing the sequence will lower the camper top. If necessary, the camper walls can be forced back into the vehicle walls by hand; however, gravity should be sufficient to cause those walls to telescopingly collapse when the camper top no longer supports them in the FIG. 3 raised configuration.

It is noted that, in order to maintain the cargo area as open as possible, it is desirable to mount the top raising motors out of the cargo area. Thus, some means of attaching the camper top to the lifting elements of such motors is needed. This means is indicated in FIGS. 1 and 11 and includes a tab T on each corner of the camper roof and located to be engaged by the lifting elements. The tabs extend through slots S defined in the truck walls. If such space-clearing feature is not desired, the lifting elements can be located within the perimeter of the cargo area as is indicated in FIG. 3. Suitable weather stripping can also be included to seal any joints and slots associated with the walls and top of the camper. Furthermore, any suitable linkage can be used to attach the camper top, either directly or via the just-mentioned tabs, to the lifting elements if such lifting elements are off-set from a location beneath the perimeter of the camper top.

Once the camper top is in the raised location, the camper aft wall can be swung out into the FIG. 2 location or attached as suitable.

The hydraulic system 60 can also be replaced by a mechanical system which includes electric motors, such as motor 90 shown in FIG. 4. In such a system, the motors include suitable drive shafts 92 having a drive gear 94 thereon. A suitable gear means, such as gear 94 is meshed with the drive gear and engages a suitable gear section on a lifting shaft. The lifting shaft corresponds to the hydraulic arm 82 and telescopingly extends as does the arm 82 to lift the camper top 50 and the camper walls as just described. The mechanical system motor is shown in FIG. 4 in conjunction with another embodiment of the camper, but is applicable to any embodiment as is the hydraulic system. The mechanical system is also shown in FIG. 5. FIGS. 5 and 6 indicate such applicability by only schematically indicating the lifting system and only schematically indicating the walls of the camper.

A further top raising system is indicated in FIG. 1 as an emergency system 100. The system 100 is used in the event of a power failure of the vehicle which would make it impossible to use the hydraulic or mechanical system to either erect or collapse the camper using the vehicle power. Such an emergency system 100 includes a hand crank 102 having a drive gear on one end which engages a driven gear attached to the camper top via a suitable gearing and/or linkage system, such as a rack and pinion system or the like, whereby rotation of the hand crank will raise or lower the camper top. Such movement of the camper top will result in the above-discussed movement of the camper walls. The emergency system is also shown in FIG. 6, and can also include a battery operated drive means which uses a battery other than the vehicle battery to drive the crank.

Figure 8:
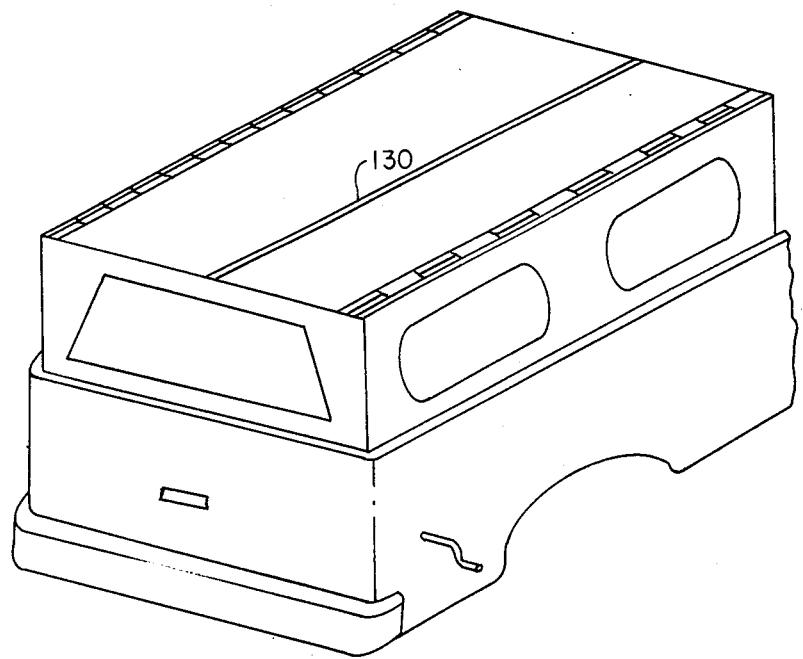
FIG. 8 is a perspective view of the FIG. 7 embodiment of the invention in the set-up condition.
Figure 7:
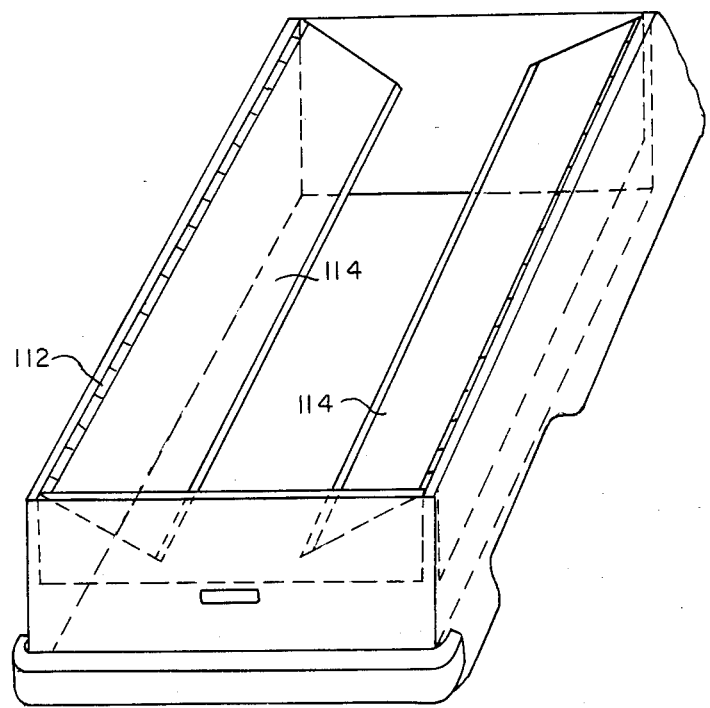
FIG. 7 is a rear perspective view showing another form of the camper/pickup truck combination of the present invention.

The telescoping embodiment of the camper can be replaced by a hinged collapsing embodiment such as indicated in FIGS. 4, 7 and 8. In such an embodiment, each of the camper side walls includes a bottom section 110 telescopingly received in an associated truck wall to move out of that wall under the influence of a suitable lifting means, such as the motor 90 shown in FIG. 4 from the collapsed, stored configuration of the camper. Each of the bottom sections also includes a top hinge 112 attaching that bottom section to a top section 114 which swings into the cargo area adjacent to the inner surface 116 of the truck side wall in the stored condition of the camper. Each top section 114 includes a hinge 118 which attaches to one end of a top portion 120 having a lip 122 on the other end thereof. The top portion swings over the wall top section 114 in accordion fashion to store the camper. The camper front wall does not have such hinge means and can be telescopingly received in the cargo front wall or mounted on top thereof as suitable.

The erection of this hinged embodiment is indicated in FIGS. 7 and 8 with the camper top not being shown in FIG. 7 for the sake of clarity. However, it can be seen from these two figures, that movement of the camper side walls from the stored location within the vehicle hollow walls by operation of the lifting system moves the camper walls into the FIG. 7 condition. The camper top is then erected by swinging the top portions downwardly and toward the center of the cargo area after both portions of the camper walls are erected by suitable movements as dictated by the hinges 112. It is noted that FIG. 4 shows the camper side walls with the bottom portions having a rack 126 for engaging a drive gear 128 which is driven by the drive gear 94. The FIG. 4 showing indicates the side wall in the condition with the bottom section 110 in the fully extended orientation and the top section and the top portion in the folded configuration. The position of the section 114 in FIG. 4 corresponds to the position thereof as shown in FIG. 7.

Once the camper walls are fully erected, the camper top sections can be swung toward each other so the lips 122 thereof engage each other. A suitable locking flange, such as Flange 130 shown in FIG. 8 can be used to ensure the continued engagement of the top sections in the FIG. 8 set-up configuration. As before, suitable windows can be included, and the camper aft wall can be attached as desired as above discussed. This aft wall can also be stored in the camper tailgate in telescoping fashion to be pulled out of such tailgate in the fashion of the telescoping walls as above discussed.

It is noted that the cargo area front wall can be omitted if suitable and the camper front wall will be correspondingly omitted. In such a case, the camper may include appropriate seals so that the movable side walls will be suitably sealed against the weather.

Figure 9:
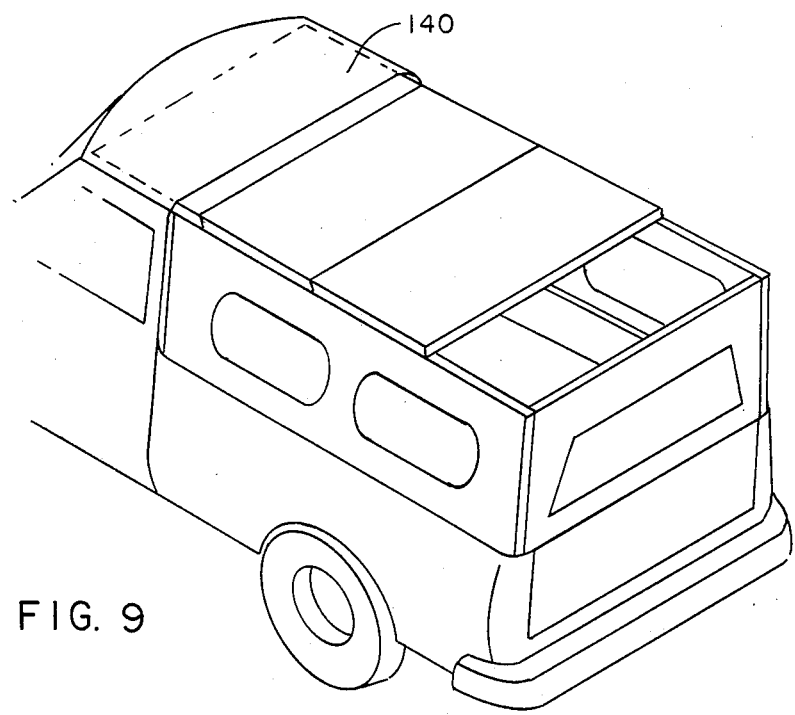
FIG. 9 is a perspective view of another embodiment of the present invention in the partially set-up configuration.

Yet other embodiments of the vehicle are shown in FIGS. 9 and 10, with these embodiments having the camper side walls 42' and 44' remaining in the set-up configuration when the camper top is in the stored condition lying on the cargo bed.

Accordingly, the FIG. 9 embodiment includes a camper top storage container 140 located on top of the cab. The camper top includes a plurality of sections, such as section 142 and the sections are stored within the container 140 on top of each other. The camper top is then set up by simply moving the sections our of the container on top of the walls. Suitable clips or the like can be used to attach the camper top to the walls. The camper aft wall can also be stored in the container 140 if desired.

In FIG. 10, the camper top 50 is stored lying on top of the cargo area bed as discussed above, and is raised as discussed above using means such as the mechanical system indicated in FIG. 10. The camper walls remain in the erected configuration and the top simply moves into place superadjacent to such walls.

Other variations of the vehicle can include camper walls having only one section, or camper walls having more than two sections. Such variations will occur to those skilled in the art based on the disclosure hereinabove.

It is to be understood that while certain forms of the present invention have been illustrated and described herein, it is not to be limited to the specific forms or arrangement of parts described and shown.

I claim:

1. A camper/pickup truck combination comprising:
   a pickup truck having a cab and a cargo area, with said cargo area being bounded by hollow side walls, a front wall, a means adapted to form a rear wall, and a bed;
   a camper mounted in said cargo area and being adapted to assume a stored configuration and a set-up configuration, said camper being configured so as to permit said cargo area to be usable when said camper is in said stored configuration, said camper including
   side walls each of which has a plurality of sections that are telescopingly connected to each other, each of said camper side walls being telescopingly received in an associated one of said hollow side walls when said camper is in said stored configuration,
   a top which is sized and shaped to fit snugly within said cargo area with said top lying on top of said cargo area bed when said camper is in said stored configuration,
   means for connecting said camper top to said camper side walls; and
   means for raising said camper top from a location lying on said cargo bed to a location spaced thereabove for moving said camper from said stored configuration to said set-up configuration.

2. The camper/pickup truck combination defined in claim 1 wherein said means for raising said camper top includes a hydraulic system.

3. The camper/pickup truck combination defined in claim 1 wherein said means for raising said camper top includes a motor.

4. The camper/pickup truck combination defined in claim 1 further including a control system having a control button mounted inside said cab.

5. The camper/pickup truck combination defined in claim 2 wherein said cargo area bed is hollow and said hydraulic system includes hydraulic lines contained within said hollow bed and said hollow sides.

6. The camper/pickup truck combination defined in claim 3 further including a control system having a control button located within said cab, with said cargo area bed being hollow and said control system having control wires contained in said hollow bed.

7. The camper/pickup truck combination defined in claim 5 wherein said cargo area includes a plurality of corners formed by the intersection of said side walls and said front wall and said hydraulic system includes a plurality of hydraulic jacks each mounted adjacent to one corner of said cargo area.

8. The camper/pickup truck combination defined in claim 1 further including an emergency top raising system mounted on one of said cargo area side walls.

9. The camper/pickup truck combination defined in claim 8 wherein said emergency top raising system includes a hand crank.

10. The camper/pickup truck combination defined in claim 1 wherein said pickup truck cargo area front wall is hollow and said camper further includes a front wall having a plurality of sections that are telescopingly connected together and which are telescopingly received in said cargo front wall when said camper is in said stored configuration.

* * * * *